OVEN DOOR LATCHING SYSTEM

Original Filed Nov. 14, 1963 3 Sheets-Sheet 1

INVENTOR.
CLARENCE GETMAN
BY Richard L. Caslin
HIS ATTORNEY

OVEN DOOR LATCHING SYSTEM

Original Filed Nov. 14, 1963 3 Sheets-Sheet 2

INVENTOR.
CLARENCE GETMAN
BY Richard L. Caslin
HIS ATTORNEY

OVEN DOOR LATCHING SYSTEM

Original Filed Nov. 14, 1963 3 Sheets-Sheet 3

INVENTOR.
CLARENCE GETMAN
BY Richard L. Caslin
HIS ATTORNEY

United States Patent Office

Re. 26,944
Reissued Aug. 25, 1970

26,944

OVEN DOOR LATCHING SYSTEM

Clarence Getman, Louisville, Ky., assignor to General Electric Company, a corporation of New York Original No. 3,350,542, dated Oct. 31, 1967, Ser. No. 645,542, June 5, 1967, which is a continuation of abandoned application Ser. No. 323,809, Nov. 14, 1963. Application for reissue Sept. 8, 1969, Ser. No. 862,988
Int. Cl. F27d *11/02*
U.S. Cl. 219—413 10 Claims

Matter enclosed in heavy brackets [ ] appears in the original patent but forms no part of this reissue specification; matter printed in italics indicates the additions made by reissue.

ABSTRACT OF THE DISCLOSURE

A heated cavity such as a baking and broiling oven or the like, with an access door that is adapted to be locked shut by a manual door latching means. There is also a locking means for holding the door latching means against movement. A solenoid is furnished that is capable of overriding the locking means so that the door latching means may be operated. The solenoid is controlled by a circuit with a momentary switch means and a temperature responsive switch means that is in heat transfer relation with the heated cavity and is open-circuited at a predetermined critical temperature and above. An indicator light is in cooperation with the temperature responsive switch means to be energized when the switch means is open-circuited so as to tell the housewife that the oven interior is in accessible when the light is lit.

This present application is *for reissue of my Pat. No. 3,350,542 which issued on Oct. 31, 1967, on application Ser. No. 645,542, filed June 5, 1967. Application Ser. No. 645,542 was* a continuation application of my application Ser. No. 323,809, filed Nov. 14, 1963 [and now abandoned]. As stated in the Barber Pat. No. 3,313,918 which issued on Apr. 11, 1967, on an application Ser. No. 387,439, filed Aug. 4, 1964, the subject of the parent application Ser. No. 323,809 and thereby of *Pat. No. 3,350,542 and of* this application is a later version of the Barber invention incorporating [the different] *certain* combinations therein described and claimed.

The present invention relates to a locking means for a door latching mechanism and particularly for a door of a high temperature domestic cooking oven of the type having an automatic heat cleaning cycle such as is described and claimed in the copending patent of Bohdan Hurko, No. 3,121,158 which was filed on Dec. 13, 1962, as a continuation-in-part of an earlier application Ser. No. 27,926 that was filed on May 9, 1960, and is now abandoned. Both this patent and application were assigned to the General Electric Company, the assignee of the present invention.

Such an oven would have the normal cooking functions of baking and broiling within a temperature range between about 150° F. and 550° F. as well as a heat cleaning operation where the temperature is raised to a maximum somewhere between about 750° F. and about 950° F. for removing the food soil and grease spatter that accumulates on the walls of the oven liner during normal cooking. Such a reaction may be characterized by the term pyrolysis which means the chemical decomposition of matter by the application of heat.

Undoubtedly, the major annoyance in using an oven for cooking is the difficulty encountered in keeping the walls of the oven liner clean after repeated usage. It is unavoidable that food particles and grease spatterings will accumulate on the hot oven surfaces during normal cooking operations. Strong chemical cleaning agents have been devised and are commercially available for the express purpose of removing food soil of this type under these conditions. However, even the best of these cleaning agents require a strong rubbing action, and a great deal of time and effort is needed to complete the task satisfactorily. Also, there is always a safety hazard that the chemicals might cause injury to the user's hands or eyes if the directions for use are not followed verbatim.

Once the principle of automatic heat cleaning of a domestic oven was perfected by the method of pyrolysis many different systems of applying the heat and controlling the cleaning operation were devised to obtain the desired result. To gain the maximum reliability, standard components were used where possible to take advantage of the years of engineering development and know-how gained by working with the components, and they were arranged in fail-safe combinations so that after years of trouble-free usage of the oven any failure of the component would not constitute a safety hazard. Instead, the failure of these components would render inoperative the heating circuit or function in which the component operates.

The present invention is concerned with means for insuring that the oven door is both closed and locked before the heat cleaning cycle can be initiated, as well as to insure that the oven door cannot be unlocked as long as the oven temperature is above the maximum normal cooking temperature.

The principal object of the present invention, therefore, is to provide a locking means for the latching mechanism of a door of a high temperature oven where said means becomes effective when the oven temperature rises above normal cooking temperatures with additional means to assure that the locking means cannot be deactivated unless the oven temperature has returned to within the maximum cooking temperature range of about 550° F. and below.

A further object of the present invention is to provide electrical controls for a high temperature oven to insure first that the oven door is closed before the high temperature operation can be initiated, as well as to insure that the oven door is also locked, and thirdly to insure that once the oven temperature rises above the maximum normal cooking temperatures that the oven door may not be unlocked, and finally to provide an indicating means to convey to the housewife the information of the temperature within the oven as being within either the normal cooking or the high temperature self-cleaning range.

The present invention, in accordance with one form thereof, is embodied in a high temperature domestic oven which may be heated either by electricity or gas. As in standard ovens, the oven cavity is formed by an insulated box-like oven liner and an access door. A door latching mechanism is provided to hold the door in a closed position during a heat cleaning cycle. A suitable automatic locking means is combined with the door latching mechanism so as to lock this mechanism in its closed position. A door operating control circuit is used to de-activate the locking means at will, depending on whether the operating temperature of the oven is within the normal cooking temperature range, and enable the movement of the door latching mechanism. This control circuit includes an electroresponsive means capable of de-activating the locking means. This electroresponsive means is electrically connected in series with a normally-closed thermal switch means that is located in heat transfer relation with the heated oven cavity. Also, there is a manual switch controller to enable the energization of the electroresponsive means. The thermal switch means is calibrated to become open-circuited whenever the cavity temperature reaches above about 575° F. thereby rendering the electroresponsive means incapable of operation. Further modifications include first and second switch means connected in series with a biasing resistor that cooperates with a variable-resistance temperature sensor in the thermostatic control circuit that has a high positive temperature coefficient of resistances. The first switch means is adapted to be closed automatically when the oven door is closed, and the second switch means is adapted to be closed automatically when the oven door is held closed by the door latching mechanism, thereby insuring the sealing of the oven door before the high temperature heat cleaning cycle can be initiated.

My invention will be better understood from the following description taken in conjunction with the accompanying drawings and its scope will be pointed out in the appended claims.

Figure 3:
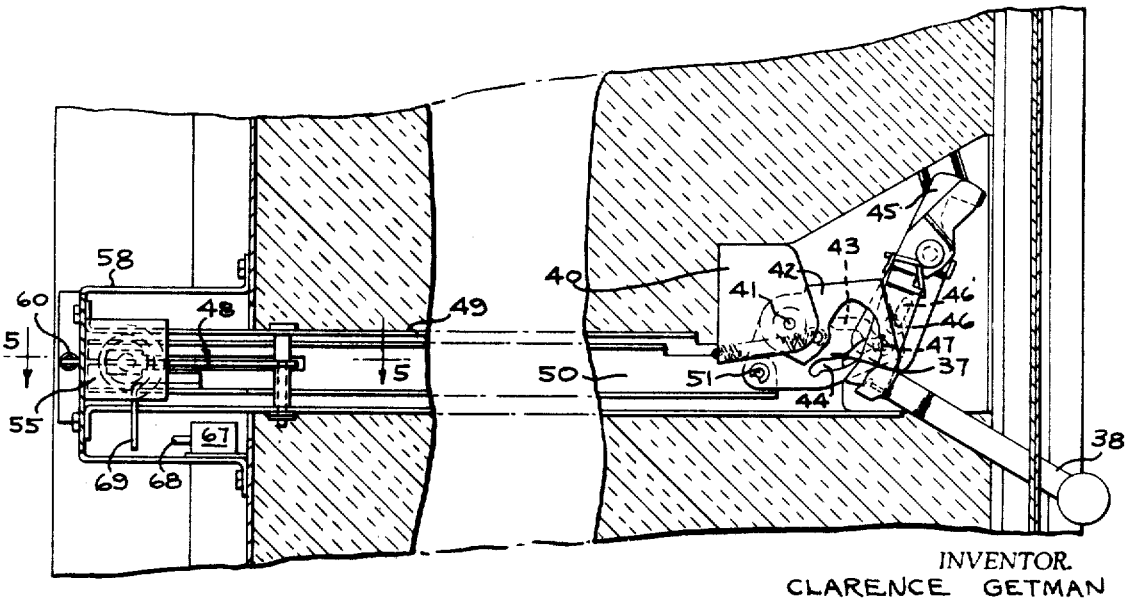
FIGURE 3 is a fragmentary plan view taken on the line 3—3 of FIGURE 1 to show the nature of both the door latching means and the means for locking the door latching means during the high temperature heat cleaning operation.
Figure 5:
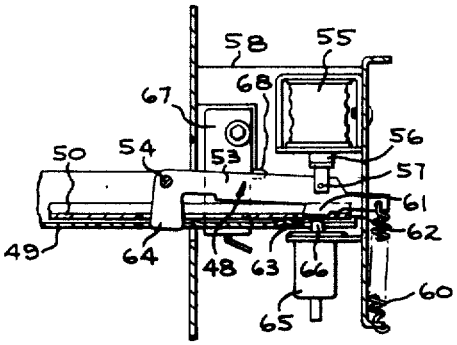

FIGURE 5 is a fragmentary right side cross-sectional elevational view of the back portion of the door latching means taken on the line 5—5 of FIGURE 3 showing the solenoid-operated locking means for the latching mechanism as well as the positions of a latch switch and a temperature sensor switch controller that are included in the temperature control circuit. This view is taken on the line 5—5 of FIGURE 3.

Figure 1:
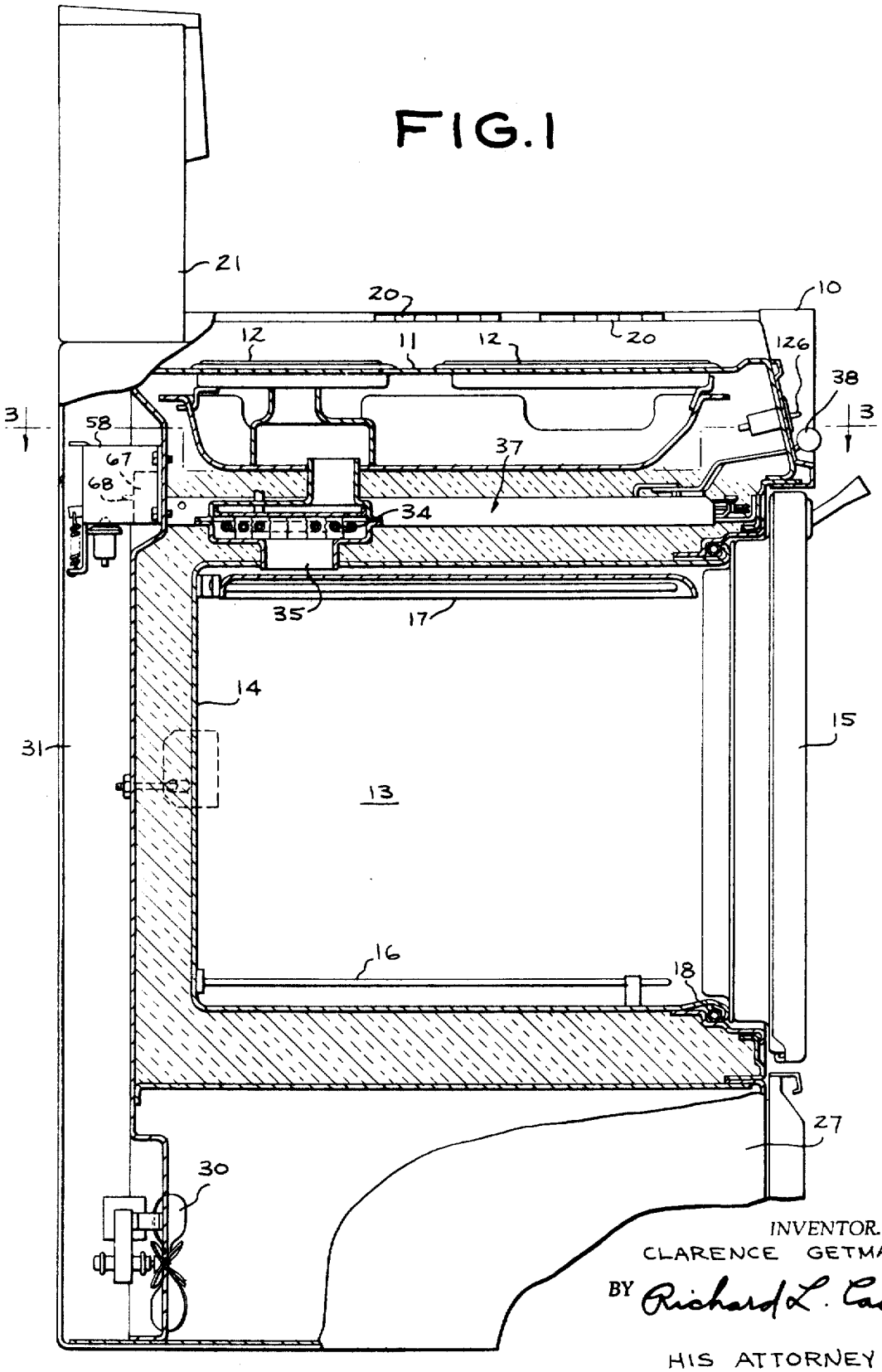
FIGURE 1 is a left side elevational view of a free-standing electric range with parts broken away and some in cross-section to show the main elements of an oven having an automatic heat cleaning feature that embodies the present invention.

Turning now to a consideration of the drawings, and in particular to FIGURE 1, there is shown for illustrative purposes a free-standing electric range 10 having a top cooking surface or cooktop 13 with a plurality of surface heating elements 12, an oven cavity 13 formed by a box-like oven liner 14 and a front-opening drop door 15. The oven cavity 13 is supplied with the two standard oven heating elements; namely, a lower baking element 16 and an upper broiling element 17. A third heating element has been added adjacent the oven door 15 to replenish the heat lost in this area and thereby retain generally uniform oven wall temperatures. This third heater is identified as a mullion or perimeter heater 18 that is wrapped around the outside of the oven liner; for example, in a manner that is taught by the Newell Patent 3,017,488 which is assigned to the General Electric Company, the assignee of the present invention.

Figure 2:
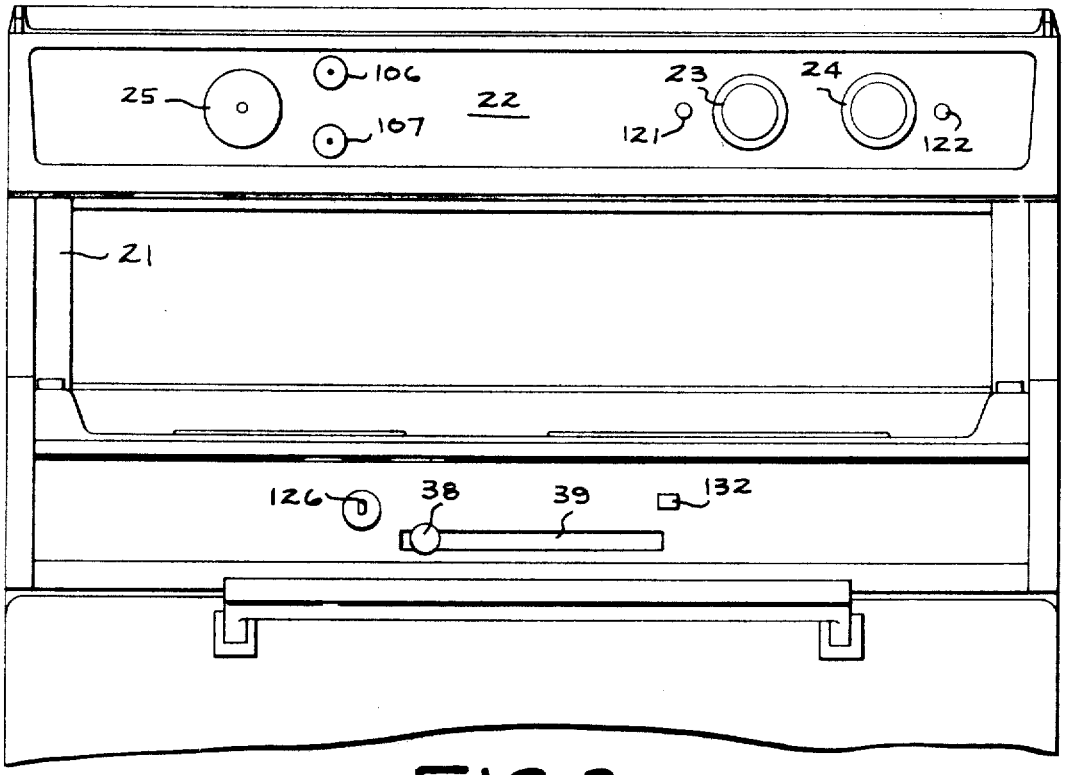
FIGURE 2 is a fragmentary front elevational view of a range showing the upper portion thereof and mainly the relationship between the oven door, the door latching mechanism, the cooktop and the control panel of the range.

The control of the surface heating elements 12 is obtained by selector switches 20 which are illustrated as multiple pushbutton switches arranged in pairs along the opposite side arms of the cooktop 11 to be oriented with the particular heating element that is being controlled thereby. In addition, the range is provided with a backsplash 21 that is vertically disposed along the back edge of the cooktop 11 and provided with an instrument or control panel 22 as is best seen in FIGURE 2. This control panel contains most of the remaining controls for the surface heating elements 12 as well as for the oven compartment. Such a control panel would ordinarily include an oven selector switch 23, an oven thermostat or temperature responder 24, an automatic surface unit control (not shown), a sequence timer 25 and suitable indicator lights 121 and 122 to show when any one of the heating elements is energized.

Other structural features that might be mentioned by name would be the outer range body or cabinet 27 which has an appearance finish of porcelain enamel or the like on the outer surface, and which serves as the superstructure that supports and encloses the various components of the range. Sandwiched between the oven liner 14 and the range body or cabinet 27 is an extra thick blanket of thermal insulating material such as fiber glass or the like. The amount of insulation being used has been increased over the amount of insulation for standard ovens because of the high operating temperatures encountered during the heat cleaning operation which will reach a maximum oven air temperature somewhere between about 750° F. and about 950° F. Another component shown is an air circulating fan 30 located in the bottom portion or drawer area of the range adjacent the back wall thereof. This fan serves to draw relatively cool room air into the range body 27 through the back of the backsplasher 21 and down a vertical duct or wiring channel 31 at the back of the range and into the bottom portion of the range where the air rises up suitable ducts (not shown) built into the opposite side walls of the oven and the air is discharged under the cooktop 11 to be exhausted through openings in and around the surface heating elements 12.

During the heat cleaning operation water vapor, free carbon, soot, carbon monoxide gases and other products of combustion are formed and these are treated before they are returned to the kitchen atmosphere. A catalytic smoke eliminator 34 is positioned in an oven vent opening 35 to serve as an oxidation and exhaust means for the oven. This catalytic smoke eliminator is of the type that is taught in the Welch Patent 2,900,483 which is assigned to the General Electric Company, the assignee of the present invention. Such a smoke, odor and vapor eliminating device includes a heating means in cooperation with a catalytic platinum surface such as a wire screen that is heated to a temperature of about 1300° F. and tends to consume the smoke odors and vapors emanating from the oven cavity, so that the oven exhaust air is treated in the manner that is best described in the aforementioned Hurko application Ser. No. 44,493 before being expelled into the kitchen.

It has been found necessary to provide a latching means for the oven door 15 to insure that the oven door is closed and cannot be opened while the oven is being operated during a heat cleaning cycle. A suitable door latching mechanism is identified as 37 in FIGURES 1 and 3, although it is best taught and claimed in the copending patent of the present applicant, Clarence Getman, No. 3,189,375 which was filed on May 1, 1963 and is assigned to the General Electric Company, the assignee of the present invention. Accordingly, only brief mention will be made here of this mechanism as it does not form part of the present invention. The latching mechanism includes a manually operable handle lever 38 which extends through an elongated slot 39 in the front edge of the cooktop 11 of the range in a position just above and parallel to the top edge of the oven door 15 as is best seen in FIGURES 1 and 2. Referring to FIGURE 3, the handle lever 38 is pivotally supported within a channel-shaped bracket 40 about the pivotal axis 41. The pivoted end of the handle lever 38 also has a channel formation 42 which fits snugly into the channel-shaped bracket 40 to provide a pair of double pivot means or trunnions so as to gain stability as the handle lever is moved within a horizontal plane through an angle of about 60°, starting from the open position of FIGURE 3 to a closed position. The channel bracket 40 includes a cam-shaped slot 43 in its lower flange cooperating with a cam-shaped slot 44 in the lower flange of the channel formation 42 of the handle lever 38.

Next, there is a latching bolt 45 which is pivotally actuated by several pin and slot connections between a recessed or hidden position as shown in FIGURE 3 to a latching position where the bolt is generally perpendicular to the front wall of the oven and in mating engagement with a keeper (not shown) within the oven door 15. There is a fixed pin 46 that cooperates with a slot 46' in the central portion of the latching bolt 45. The innermost end of the latching bolt 45 is provided with a follower pin 47 which operates within bolt cam slots 43 and 44 of the bracket 40 and the channel formation 42 of the handle lever 38 respectively so as to obtain the proper action. It should suffice to summarize that the door latching mechanism 37 includes a pivoted handle lever 38, a fixed mounting bracket 40 and a pivoted latching bolt 45 for making engagement with the oven door 15. If more details of this mechanism are desired they can be obtained from the previously-mentioned Getman application which is copending herewith.

The description given above has been for the purpose of setting the stage and explaining the environment and utility for the present invention. Associated with the door latching means 37 is a solenoid-operated locking means 48 as is best seen in FIGURES 3 and 5 for locking the door latching mechanism 37 in both the open and closed positions. The purpose of locking the door latching mechanism 37 in its open position is to insure that it cannot be thrown to the closed position inadvertently, while it is locked in the closed position to insure that the door cannot be unlocked and the door opened during any part of a high temperature heat cleaning operation. Looking at FIGURE 3, the locking mechanism 48 is provided with an elongated upturned channel-shaped support bracket 49 that extends from the front to the back of the range and is made integral with the mounting bracket 40 of the door latching mechanism 37. The other end of the support bracket 49 terminates within the cooling duct or wiring channel 31 at the back of the oven.

The main purpose for locating the locking mechanism 48 at a distance remote from the door latching mechanism 37 and the front of the oven is to remove the locking mechanism 48 from the high temperature areas of the range and to place it within the stream of relatively cool room air that is drawn into the range by the action of the ventilating fan 30, as was mentioned previously. Movably mounted within the support bracket 49 is a connecting rod 50 which is joined at its front end with the handle lever 38 of the door latching mechanism as at pivot point 51. Accordingly, as the handle lever 38 is shifted from its open to its closed position the connecting rod 50 will reciprocate within the support bracket 49 through a distance of about one inch.

Now turning to FIGURE 5, the back end of the locking mechanism 48 is provided with a solenoid-operated pivoted bolt 53 that makes engagement with the connecting rod 50 in both of its extreme positions, thereby requiring the movement of the pivoted bolt before the connecting rod and hence the handle lever 38 can be moved. The bolt 53 is pivoted about a horizontal axis 54, and it is motivated by the solenoid 55 that has a vertically acting armature 56 pivotally connected to the bolt as at 57. The solenoid 55 is fastened to a hat-shaped channel member or bracket 58 as can best be pictured in FIGURE 3, said bracket being utilized to mount the combined door latching mechanism 37 and door locking mechanism 48 to the range body 27. The pivoted bolt 53 is normally biased in a downward direction by a tension spring 60. The other end of the bolt has a down-turned finger portion 61 that cooperates with both the back edge 62 of the connecting rod and a slot 63 closely spaced therefrom. Looking at FIGURE 5, the connecting rod 50 is shown in its position when the handle lever 38 is in the open position of FIGURE 3. The finger 61 of the pivoted bolt 53 is lodged in the slot 63 of the connecting rod so that the rod cannot be moved until the solenoid 55 is energized to lift the bolt out of the slot against the downward force exerted by the tension spring 60. When the handle lever 38 is in its closed position, the finger 61 of the bolt 63 is engaged behind the innermost end 62 of the connecting rod so that the door latching mechanism cannot be opened until the solenoid 55 is operated to lift the bolt as heretofore.

The pivoted bolt 53 also includes a second down-turned finger 64 which extends through a suitable slot in both the connecting rod 50 and the support bracket 49. This down-turned finger 64 serves to guide the movement of the connecting rod 50 so as to provide smooth operation thereof. A temperature senser switch controller 65 is positioned below the finger 61 of the pivoted bolt 53, and this switch has a button 66 that is engaged by the finger 61 when the door latch mechanism is closed and the solenoid 55 is de-energized for reasons which will better be understood hereinafter. A second switch member 67 is mounted to the bracket 58, and it has a switch button 68 that is adapted to be engaged by a tab 69 that is attached to the connecting rod 50 as is best seen in FIGURE 3. This latch switch 67 is a single-pole double-throw switch serving as part of the protector means for the oven as will also be fully explained hereinafter.

Figure 4:
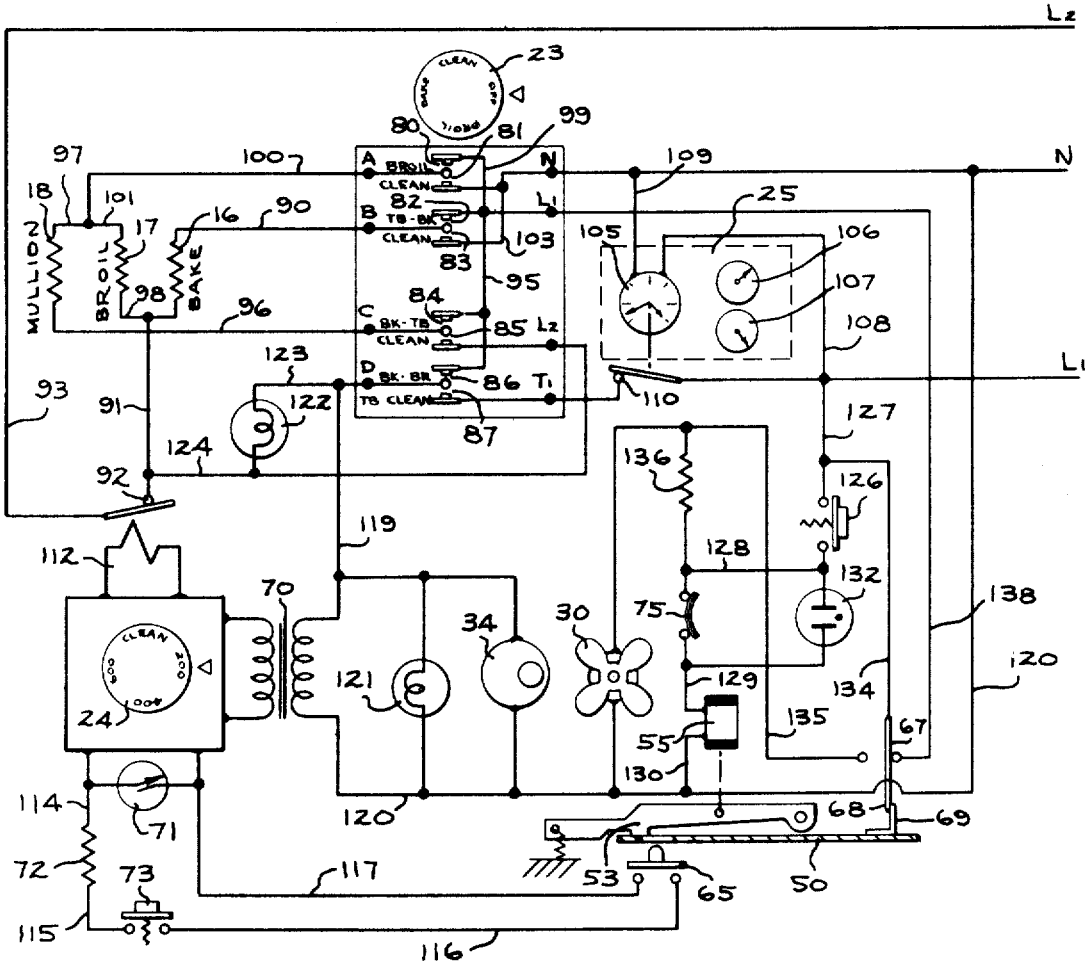
FIGURE 4 is a diagram of both the power and control circuits for the heating system of the oven of the present invention.

Turning now to a consideration of the circuit diagram of FIGURE 4, the electric range of the present invention is provided with an electrical service of 3-wire Edison source of power nominally of 240 volts, single phase, 60 cycle A.C. which is usually available in the average residence having adequate wiring. This voltage source has a pair of line wires L1 and L2 and a grounded neutral conductor N for supplying the sequence timer 25, the oven selector switch 23 and the load characterized by the three heating elements; namely, the baking element 16, the broiling element 17, and the mullion heater 18. There is also a low voltage temperature control circuit for the oven thermostat 24 which is fed by a step-down transformer 70 for providing about 12 volts in a circuit that includes the thermostat 24, a variable-resistance temperature sensor 71, a biasing resistor 72, the operation of which will be explained hereinafter, the sensor switch controller 65 that was mentioned proviously and a normally open door-operated switch 73 which will be closed when the oven door is closed.

In addition to the power circuit and the low voltage temperature control circuit, there is a door latch control circuit that includes the following elements: the connecting rod 50 of the door latch mechanism 37, the pivoted bolt 53 that is operated by the solenoid 55, the single pole, double throw latch switch 67 that is operated by the movement of the door latching mechanism, and the fan motor 30 for circulating room air between the range body and the insulated oven structure. Other elements will be described during a detailed description of the circuit operation.

Means must also be provided to prevent the operation of the door latching mechanism 37 once the temperature within the oven cavity rises above the maximum normal cooking temperature of about 550° F. For this purpose a normally-closed thermal switch 75 is arranged in series with the solenoid 55 so that as soon as the oven temperature rises above the maximum normal cooking temperatures, the thermal switch 75 will open and the solenoid 55 is thereby de-energized so that the door latch mechanism cannot be moved until the oven temperature returns to the normal cooking temperature range. More details of the interrelation between the mechanism and the locking means therefor will be given after detailed descriptions of the power circuit and the temperature control circuit.

The oven selector switch 23 is provided with four line terminals or poles N, L1, L2, and T1 for connection with the lead wires from the power supply. Terminal T1 is for use by the sequence timer 25 as will be explained later. The selector switch 23 also has four load terminals identified as A, B, C and D as well as 8 sets of switch contacts 80–87 inclusive. These switch contacts are each labeled with the operation that takes place when the respective contacts are closed. For example, during a baking operation, contacts 82, 84 and 86 are closed. During a broiling operation contacts 80 and 86 are closed, while during a timed baking operation contacts 82, 84 and 87 are closed. Finally, during the heat cleaning operation contacts 81, 83, 85 and 87 are closed.

The baking circuit has the baking element 16 connected directly across full voltage of 240 volts from line L1 to L2, while at the same time the broiling element 17 is in series with the mullion heater 18 in a circuit that parallels the baking element. This can be better understood by tracing the circuit as follows: for the baking element 16, the circuit is from line terminal L1, through switch contacts 82 to load terminal B, and then by lead 90 through baking element 16, by lead 91 through the closed thermostat contacts 92, and by lead 93 back to line L2. As for the broiling element 17 and mullion heater 18, the circuit is as follows: from the line terminal L1 by internal switch lead 95 to switch contacts 84 to load terminal C and then by lead 96 through the mullion heater 18 and then in series with the broiling element 17 by lead 97, and then by lead 98 and leads 91 and 93 back to line L2 through the thermostat contacts 92.

The broiling circuit has the broiling element 17 as the only element that is energized, and it is connected across the 240 volts of lines L1 and L2. The circuit is from line terminal L1 through internal switch lead 99 to switch contacts 80 and then to load terminal A. Then, by leads 100 and 101 to the broiling element 17 and then back to the line L2 through leads 98, 91 and 93 as well as through the thermostat contacts 92.

Next to be considered is the heat cleaning circuit where all three heating elements 16, 17 and 18 are connected in parallel across one-half line voltage of 120 volts from neutral conductor N to line L2. For example, the circuit for the mullion heater 18 is from line terminal N through switch contacts 81 to load terminal A, and by leads 100 and 97 to mullion heater 18, and then by lead 96 to load terminal C to switch contacts 85 to line terminal L2 and then by lead 124 through the thermostat contacts 92, and then by lead 93 to line L2. In a similar manner, the circuit for the broiling element 17 is from load terminal A through leads 100 and 101 through broiling element 17 and back to line L2 through leads 91 and 93 and closed thermostat contacts 92. Lastly, the baking element circuit is from line terminal N through internal switch lead 103 through switch contacts 83, and then by lead 90 through baking element 16, and then back to line L2 through leads 91 and 93 and through thermostat contacts 92.

As mentioned previously, the power circuit is provided with a single sequence timer 25, for timing both the baking operation and the heat cleaning operation. An example of a suitable timer is that disclosed in the Zagorski Patent 3,038,041 which is assigned to the General Electric Company, assignee of the present invention. This type of timer would include an electric clock mechanism 105, a start dial 106 and a stop dial 107 so that the timer could be set for an automatic closing or starting of the power circuit at a given starting time set on the dial 106, and the circuit would be opened automatically at a given stop time set by the dial 107. This timer mechanism must be electrically energized, and it is shown as being connected across line L1 and neutral conductor N by leads 108 and 109, respectively. The timer 25 has a single pole switch contact 110 that is interposed in the line L1 ahead of the line terminal T1. Accordingly, to bring the sequence timer 25 into the power circuit during the time baking or heat cleaning operations, the switch contacts 87 must be closed in place of the switch contacts 86 which are closed only during the baking and broiling operations.

Turning now to a consideration of the temperature control device or thermostat 24, it is of the general type that is taught in the United States patent to Harry I. Baker, 2,962,575. Such devices over the years have proved to be quite satisfactory for use as oven thermostats for normal cooking temperatures, but none of them have been commercially available at a reasonable price to extend over the wide temperature range that would cover in addition to the normal cooking temperatures, the heat cleaning temperatures between about 750° F. and about 950° F., and still have the necessary degree of accuracy throughout the entire range of temperatures. An improvement has been made in this control system by the introduction of a biasing resistor 72 that is shunted across a variable-resistance temperature sensor 71 (located within the oven cavity) when the heat cleaning temperature range is desired. This biasing resistor 72 functions to shift the control point of the circuit so as to be able to obtain accurate results for the complete range of temperatures. The thermostat 24 is a manually settable responder that may include a voltage regulating relay (not shown) so that the sensor 71 varies the effective output voltage of the relay in accordance with the sensed temperature within the oven cavity regardless of variations in the line voltage. The thermostat may also include a responder relay (not shown) that receives the effective output voltage of the voltage regulator and controls the output relay 112 that includes the thermostat contacts 92, which were mentioned previously as being the single pole switching means for controlling the temperature within the oven cavity. See the Welch Patent No. 3,122,626 for more information in this regard.

Several precautionary measures are built into this temperature control circuit to insure that the oven door 15 is closed and the door latching mechanism 37 is moved to its closed position before the heat cleaning operation can be initiated. Connected in series with the biasing resistor 72 is both a door switch 73 that is closed when the door is closed and a temperature sensor switch controller 65 that is closed with the door latching mechanism is closed. This door switch 73 is not illustrated in the assembly views of FIGURES 1–3, but only in the circuit diagram of FIGURE 4. However, those skilled in this art will understand that the switch is to be mounted on the front face of the oven adjacent the door opening and within the outlines of the door so that when the door is closed the door switch 73 is contacted by the door and thereby closed. Suitable leads 114, 115, 116 and 117 connect the biasing resistor 72 in parallel with the temperature sensor 71 and connect the door switch 73 and sensor switch 65 in series with the biasing resistor 72 when these switches are closed.

Whenever the oven selector switch 23 is set in an energizing position, as distinguished from an OFF position, a circuit is completed through the step-down transformer 70 by means of load terminal D and leads 119 and 120 which is in turn connected back to the neutral conductor N. Connected in a parallel circuit across the primary of the transformer 70 is an oven indicator light 121 as well as the smoke eliminator 34 which was mentioned previously. This means that whenever the power circuit to any one of the heating elements 16–18 is completed the transformer 70 and the low voltage temperature control circuit that includes the thermostat 24 will be energized as will the indicator light 121 and smoke eliminator 34. Moreover, a cycling pilot light 122 is connected in the power circuit so as to be energized whenever the thermostat contacts 92 are closed. This connection is made by a lead 123 to the load terminal D and by lead 124 to the thermostat contacts 92.

Finally, there is an electrical control circuit for the locking means 48 for the door latching mechanism 37. As explained previously, it is not possible to move the door latching mechanism by throwing the handle lever 38 until the pivoted bolt 53 is withdrawn from engagement with the connecting rod 50 by operating the solenoid 55. This solenoid is connected in a series circuit with a momentary pushbutton switch 126 that is in turn connected across line L1 and neutral conductor N by means of lead 127, 128, 129, 130 and the return lead 120. It is also important to insure that the door latching mechanism 37 cannot be opened, once it is closed after the oven temperatures have reached into the heat cleaning range above the maximum normal cooking temperature range of about 550° F. This feature is provided by a normally-closed bimetallic or differential expansion switch 75 located in series with the solenoid 55 between leads 128 and 129. This thermostat is calibrated to be normally closed at all temperatures below the maximum cooking temperature range of about 550° F. Once the oven temperature rises above this maximum the thermal switch 75 would be opened and the solenoid 55 would thereby be rendered inoperative in spite of any subsequent closing of the momentary switch 126.

It is also well to have a visual indication when the oven is operating in its heat cleaning cycle to inform the housewife that the door latching mechanism 37 cannot and should not be opened. This information is supplied by a lock light or neon glow lamp 132 that is shunted across the thermal switch 75. This lock light 132 is energized whenever the door latching mechanism 37 has been closed which, in turn, causes the tab 69 on the connecting rod 50 of the latching mechanism 37 to shift forward and engage the button 68 of the single-pole double-throw switch 67 to complete a circuit between line L1 and neutral conductor N when the thermal switch 75 has been opened by a high temperature condition. This circuit may be traced from line L1 to lead 127 and lead 134 to the latch switch 67 and then by lead 135 through a current limiting resistor 136 which is connected in series with the parallel circuit of the lock light 132 and the thermal switch 75 as well as with the solenoid 55. The purpose of the resistor 136 is to allow the passage of very little current when the door is latched so that only the lock light 132 is energized and there is not enough current available to operate the solenoid 55. This is done so that it is not necessary to depress the manual switch 126 in order to energize the lamp 132. In the specific embodmient illustrated, this resistor has a rating of about 5,000 ohms. Thus, the closing of the momentary pushbutton switch 126 serves to short out the resistor 136 thereby actuating the solenoid 55. An alternate circuit would be to have the resistor 136 connected in parallel with a series connection of the momentary switch 126 and the solenoid 55. This arrangement is then in series with a parallel circuit comprising on the one hand a neon glow lamp 132 and on the other hand the thermal switch 75. It should be noticed that the air circulating fan 30 is connected in this solenoid circuit across L1 and N so as to be energized whenever the door latching mechanism 37 is closed.

Mention is also made of the fact that when the latch switch 67 is in its unlatched position as shown in FIGURE 4, the switch is connected in series with the line terminal L1 of the selector switch 23 by means of lead 138. In other words, the line terminal L1 of the selector switch 23 is only energized when the door latching mechanism is in its open or unlatched position. This is important to insure that the heat cleaning operation cannot be initiated when the manual controls are not set properly. If this were possible, the selector switch 23 might be set at either its baking or its broiling positions across full line voltage of 240 volts and permanent damage could be done to the porcelain enamel of the oven liner 14 due to the rapid heat rise. Accordingly, if the door latching mechanism is closed when the oven switch is not set at the clean position, the latch switch 61 will disconnect the line L1 from the selector switch thereby de-energizing the power circuit and turning out the cycling pilot light 122, and the oven indicator light 121, while leaving only the lock light 132 energized.

Modifications of this invention will occur to those skilled in this art therefore it is to be understood that this invention is not limited to the particular embodiments disclosed but that it is intended to cover all modifications which are within the true spirit and scope of this invention as claimed.

What I claim as new and desire to secure by Letters Patent of the United States is:

1. In *a high temperature oven for domestic use having* a heated cavity formed by an insulated box-like body and an access door for closing and sealing said cavity, and heating means arranged for connection to an energy source for raising the temperature within the cavity *for normal cooking operations between about 150° F. and 550° F. as well as for a heat cleaning operation that rises above 750° F. for removing food soil lodged on the walls of the cavity,* and door latching means movable between an open and closed position, locking means for holding the door latching means against movement in its closed position; the improvement comprising an electroresponsive means capable of over-riding the locking means so that the door latching means may be operated, and a normally-closed temperature responsive switch means located in heat transfer relation with the heated cavity and being *directly connected* in a series electrical circuit with the electroresponsive means and a momentary contact switch means so that closure of the momentary contact switch means will energize the electroresponsive means and free the door latching means from the locknig means, the rise in temperature within the heated cavity above a predetermined critical temperature *above the normal cooking temperatures* serving to open the temperature responsive means and thereby de-activate the electroresponsive means until such temperature returns below the critical temperature limit.

2. The invention as recited in claim 1 with the addition of an indicator lamp means shunted across the temperature responsive switch means, and a current limiting resistor connected in series with the lamp means so as to energize the lamp when the temperature responsive switch means is open circuited by a critical temperature condition although the momentary contact switch means is not closed.

3. In a control circuit for an oven heating system comprising a source of electrical energy, a plurality of heating elements connected to the energy source *for supplying heat energy for normal cooking operations between about 150° F. and 550° F. as well as for a heat cleaning operation between about 750° F. and 950° F.,* and a selector switch cooperating with the heating elements for obtaining various circuit combinations, a thermostatic control circuit including a variable-resistance temperature sensor, a responder and an output relay that governs the amount of energy supplied to the heating element, a biasing resistor capable of being shunted across the temperature sensor so as to change the control point of the thermostatic control circuit; the improvement comprising a first and a second normally-open switch means connected in series with the biasing resistor to insure the closure of these switches before the application of the said biasing resistor, the said first switch means being adapted to be closed when an access door of the oven is closed, the said second switch means being adapted to be closed when the oven door is held closed by a door latching means, and locking means for holding the door latching means against movement from its closed position, a solenoid operator for overriding the locking means to enable the operation of the door latching means, said solenoid operator being in a series circuit with a manual switch means and a normally-closed thermal switch that is open-circuited at a predetermined critical temperature.

4. A control circuit as recited in claim 3 with the addition of a current limiting resistor capable of being shunted around the manual switch means by a third switch means that is closed by movement of the door latching means to a closed position, an indicator lamp shunted around the normally closed-thermally operated switch, said lamp being energized whenever the door latching means holds the oven door in the closed position and the oven temperature is above the predetermined critical temperature.

5. In a high temperature oven for domestic use comprising a cabinet structure enclosing a box-like oven liner that has an open front that is adapted to be closed by an access door, where the oven liner and door define an oven cooking cavity, means for supplying heat energy into the oven cavity for normal cooking operations between about 150° F. and 550° F. as well as for a heat cleaning operation between about 750° F. and 950° F. for removing food soil lodged on the walls of the oven cavity, and a door latching mechanism movable between an open and closed position for holding the door closed during the heat cleaning operation, and a spring-actuated locking means engageable with the door latching mechanism in its closed position to prevent the movement of the said mechanism; the improvement comprising a normally-closed thermal switch and a normally-open switch means, and a door operating circuit including an electroresponsive means mechanically connected to the said locking means and electrically in series with the normally-closed thermal switch and the normally-open switch means, the door control circuit being connected to a source of electrical energy so that the closure of the said switch actuator will energize the electroresponsive means and cause it to disengage the locking means from the door latching mechanism and permit free movement of the said mechanism, the said thermally-responsive switch being calibrated to be opened before reaching a critical temperature [rangs] *range* so that the door cannot be unlocked when the oven temperature is above a predetermined critical temperature *above normal cooking temperatures.*

6. A high temperature [over] *oven* for domestic use comprising a cabinet structure enclosing an insulated box-like oven liner that has an open front that is adapted to be closed by an access door, where the oven liner and door define a cooking cavity, *heating* means for supplying heat energy into the oven cavity for normal cooking operations between about 150° F. and 550° F. as well as for a heat cleaning operation between about 750° F. and 950° F. for removing food soil lodged on the walls of the oven cavity, and door locking means movable between an open and closed position for holding the door closed during the heat cleaning operation *when the temperature is above normal cooking temperatures;* the invention comprising a solenoid-operated locking member engageable with the door latching mechanism in both its open and closed positions to prevent the movement of said mechanism therefrom, and a door operating control circuit that includes a solenoid joined to said locking member and electrically connected in series with a manual switch controller, a normally-closed thermal switch and a source of electrical energy, whereby the closure of the manual switch controller will energize the solenoid and serve to release the locking member from the latching mechanism, the said thermal switch being calibrated to open at a predetermined critical temperature *above normal cooking temperatures* so as to de-activate the door latching mechanism when the temperature within the oven cavity is anywhere above the critical temperature.

7. *In a household high temperature oven having a* heated cavity formed by an insulated box-like body and an access door for closing and sealing said cavity, heating element means for converting an electrical energy source into heat, and a selector switch governing the heating element means for obtaining various power [circuits combination] *circuit combinations* from said energy source, a temperature control circuit including an electrical variable-resistance temperature sensor cooperating with a responder and an output relay means to govern the amount of energy supplied to the heating element means during normal cooking operations of between about 150° F. and 550° F., a biasing resistor connected in a circuit and adapted to be shunted across the sensor so as to shift the control points of the temperature control circuit into a high temperature range between about 750° F. and 950° F., a normally-open interlock switch means connected in series with the biasing resistor to require the closure of the switching in order to energize said biasing circuit, and door latching means movable between an open and closed position and adapted to hold the door in a closed position during the high temperature operation, said door latching means serving to close the interlock switch when the oven door is latched in its closed position, locking means for locking the door latching means in its closed position; the improvement comprising an electroresponsive means capable of de-activating the locking means to free the door latching means for operation, and a normally-closed thermal switch means located in heat transfer relation with the heated cavity and in a series electrical circuit with the electroresponsive means, said thermal switch means being calibrated to become open-circuited before reaching a critical cavity temperature *above normal cooking temperatures,* and an indicator lamp means shunted across the thermal switch means, and a current limiting resistor in series with the lamp means so as to energize the lamp whenever the temperature responsive switch means is open-circuited by a critical temperature condition, and momentary contact switch means in series with the electroresponsive means for energizing the same whenever the thermal switch means is closed.

8. In a high temperature oven for domestic use as recited in claim 5 wherein the said electroresponsive means comprises a solenoid, and an indicator lamp shunted across the normally-closed thermal switch, and a current limiting resistor connected in series with the said lamp so as to energize the lamp when the thermal switch is open circuited by a critical temperature condition.

9. In a household *high temperature* oven having a cavity formed by an insulated box-like body and an access door for opening and closing said cavity, heating means arranged for connection to an energy source for raising the temperature within the cavity *for normal cooking operations between 150° F. and 550° F. as well as for a heat cleaning operation that rises above 750° F. for removing food soil lodged on the walls of the cavity,* door latching means movable to an open and a closed position, and locking means for normally holding the door latching means against movement in its closed position; the improvement comprising an electroresponsive means capable of overriding the locking means so that the door latching means may be operated, temperature responsive switch means *having actuating means* located in heat transfer relation with the heated cavity *and contact means operated by said actuating means,* a momentary contact switch means, and circuit means *directly* connecting said electroresponsive means with *said contact means of* said temperature responsive switch means and said momentary contact switch means so that closing of said momentary switch means will energize the electroresponsive means and free the door latching means from the said locking means, the rise in temperature within said heated cavity above a predetermined temperature *above normal cooking temperatures* [serving to actuate] *causing the actuating means of* the temperature responsive switch means *to actuate said contact means thereof* and thereby render the circuit means incapable of energizing the electroresponsive means while the temperature in said cavity is above said predetermined temperature, said temperature responsive switch means permitting energization of said electroresponsive means when the temperature in the cavity returns below said predetermined temperature.

10. In a household *high temperature* oven having an insulated box-like body and an access door for opening and closing said cavity, heating means arranged for connection to said energy source for raising the temperature within the cavity during normal cooking operations of between about 150° F. and about 550° F. as well as into a heat cleaning temperature range above about 750° F., door latching means movable to an open and a closed position, locking means for normally holding the door latching means against movement in its closed position, the improvement comprising an electroresponsive means capable of releasing the locking means so that the door latching means may be operated, and temperature responsive means located in heat transfer relation with the heated cavity, a manually operated switch means, and circuit means connecting said electroresponsive means with said temperature responsive means and the manually operated switch means so that closing of the manually operated switch means will energize the electroresponsive means and free the door latching means from the locking means, the rise in temperature within the heated cavity above the normal cooking temperature range serving to actuate the temperature responsive switch means and thereby render the circuit means incapable of energizing the electroresponsive means while the temperature in said cavity is above said normal cooking temperatures even though said manually operated switch means is closed, whereby when the temperature in the cavity returns to within the normal cooking temperature range said temperature responsive means permits energization of said electroresponsive means.

References Cited

The following references, cited by the Examiner, are of record in the patented file of this patent or the original patent.

UNITED STATES PATENTS

| | | | |
|---|---|---|---|
| 3,050,048 | 8/1962 | Scott | 126—273 |
| 3,125,365 | 3/1964 | Eigelbach | 292—7 |
| 3,317,708 | 5/1967 | Bowling | 219—412 |
| 3,313,918 | 4/1967 | Barber | 219—412 |
| 3,301,999 | 1/1967 | Chisholm | 219—393 |
| 2,470,043 | 5/1949 | Monsarrat | 34—45 |

VOLODYMYR Y. MAYEWSKY, Primary Examiner

U.S. Cl. X.R.

34—45; 219—397